United States Patent
Bigus et al.

(10) Patent No.: US 7,797,268 B2
(45) Date of Patent: Sep. 14, 2010

(54) METHOD, APPARATUS, AND PROGRAM PRODUCT FOR MATCHING MULTIVARIATE DATA TO FUZZY SETS

(75) Inventors: Joseph Phillip Bigus, Rochester, MN (US); Donald Allen Schlosnagle, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1502 days.

(21) Appl. No.: 10/712,563

(22) Filed: Nov. 13, 2003

(65) Prior Publication Data
US 2005/0107894 A1    May 19, 2005

(51) Int. Cl.
*G06N 7/02* (2006.01)
(52) U.S. Cl. ................ 706/52; 706/1; 706/8; 706/62
(58) Field of Classification Search .......... 706/1–9, 706/52, 62; 700/50
See application file for complete search history.

(56) References Cited

U.S. PATENT DOCUMENTS 3,933,028 A    1/1976    Laud et al.
5,518,603 A    5/1996    Furuhashi et al.
6,278,986 B1 *    8/2001    Kamihira et al. ............. 706/25

OTHER PUBLICATIONS

Steven D. Kaehler, Fuzzy Logic, Mar. 1998, Encoder, Part I-VI.*
"Fuzzy Logic-an Introduction", Stephen D. Kaehler, Mar. 1998, Parts 1-6.*

* cited by examiner

*Primary Examiner*—Donald Sparks
*Assistant Examiner*—Omar F Fernandez Rivas
(74) *Attorney, Agent, or Firm*—Roy W. Truelson

(57) ABSTRACT

Disclosed is a controller that includes a curve matching mechanism. The curve matching mechanism employs Fuzzy Logic to compare input curves to standard curves and to thereby characterize the input curves. Also disclosed in an automotive environment for the curve matching mechanism in which a Fuzzy Controller is used to receive time series data (i.e., input curves) and to present the input curves to the curve matching mechanism. The controller then uses the output of the curve matching mechanism to adjust engine function.

30 Claims, 6 Drawing Sheets

METHOD, APPARATUS, AND PROGRAM PRODUCT FOR MATCHING MULTIVARIATE DATA TO FUZZY SETS

FIELD OF THE INVENTION

The present invention relates to analysis of multivariate data, and in particular, to recognizing patterns in the data.

BACKGROUND OF THE INVENTION

Multivariate data analysis can be simply characterized as the study of how two or more factors are related to one another. For example, wind chill is the well known effect of the combination of low temperature and wind speed. Another good example of multivariate data analysis is the study of how "things change over time." As time passes, children grow to be adolescents and then adults. Crops starting as seeds in the Spring grow into plants that are harvested in the Fall. Scientists who are interested in various fields of endeavor take measurements of "things" that change over time and attempt to draw conclusions from those measurements. Measurements of things that change over time are referred to in this patent as time variant or time series data. Thus, the study of time variant data is a form of multivariate data analysis.

The way in which time-based measurements are taken depends upon what is being measured. For example, each growing season agronomists take plant size measurements, temperature measurements, and precipitation measurements to try and determine what factors contribute to high crop yields. Measurements can also be taken in a more automated way through the use of sensors. The information collected from the sensors can be used to make more or less "real" time adjustments to the systems being monitored.

A good example of this sensor/real time adjustment approach is the modern day automobile engine. Today's car engines have a significant number of sensors and at least one computer controller that analyses the readings (i.e., measurements) of the sensors to make adjustments to the engine's behavior. The interplay between an engine's oxygen sensor and its computer controller is but one example. Researchers determined some time ago that a specific mixture of air and gasoline would yield the least pollution. A mixture with too much gasoline, called a rich mixture, results in fuel being left over after combustion. The excess fuel enters the environment through the exhaust pipe as hydrocarbons, which are considered a pollutant. On the other hand, a mixture with too much air, called a lean mixture, produces nitrogen-oxide pollutants. The problem of course is that the amount of air an engine can pull in depends upon a variety of factors that change over time (e.g., altitude, air temperature, engine temperature, barometric pressure, engine load etc.). To solve this problem, an oxygen sensor is placed in the exhaust system to determine whether the mixture is lean or rich mixtures at various times. The controller gathers the ongoing sensor measurements and adjusts the fuel/air mixture accordingly.

It is easy to see how the analysis of time series data can be used to solve a significant number of problems. What is difficult, though, is identifying patterns within the time series data that permit application of well-known solutions. Said another way, a measurement pattern that points to a problem/solution may be understood, but recognizing the measurement pattern within the time series data is a difficult process. In the prior art there are numerous methods for computing the similarity of two time series data curves. These methods include probablistics models using dynamic curve matching, deformable Markov model templates, and piecewise matching of subcurves. All of these matching methods are complex mathematically and there is no easy way to describe the shapes of the curves using a natural language (such as English). Without a mechanism to specify known shapes of curves using natural language and to compute a similarity measure between arbitrary time series data curves and the known curve shapes, the analysis of time series data will continue to be a difficult, time consuming, and expensive endeavor.

SUMMARY OF THE INVENTION

The present invention provides a method, apparatus, and program product for recognizing patterns in multivariate data using Fuzzy Logic. Also disclosed is a controller that acts upon the recognized patterns to adjust the system behavior.

The preferred embodiment of the present invention provides these benefits through the example application of an automobile engine. A Fuzzy Controller is embedded into the controller of an automobile. The Fuzzy Controller or the preferred embodiment analyses time series data generated by two different sensors, matches trends exhibited by the data against previously observed trends, and directs that certain actions be taken to adjust the automobile engine based upon which trends are exhibited.

DETAILED DESCRIPTION

Brief Fuzzy Logic Overview

The preferred embodiment of the present invention utilizes enhanced Fuzzy reasoning to provide its benefits and advantages. This high-level Fuzzy Logic overview is provided as technical background for those readers who are unfamiliar with Fuzzy Logic concepts. Readers who are familiar with Fuzzy Logic may want to proceed directly to the Description of the Preferred Embodiment section of this patent.

Fuzzy Logic can be thought of as a bridge between how computers "think" and how humans think. Humans tend to think in terms of degree rather than in terms of completely true or completely false. Without Fuzzy Logic, computer programmers are required to think in computer terms by breaking problems down into a series of yes/no answers. The phrase Boolean Logic is often used to refer to these yes/no answers. With Fuzzy Logic, the programmer can express decisions based on more natural language using something akin to "shade of grey." For example, controlling the speed of a motor on a fan could be expressed using a Fuzzy Rule such as: if temperature is hot and humidity is sticky then motor is fast. Where hot, sticky, and fast are expressed in degrees rather than in terms of yes or no.

Consider a simplistic comparison of Boolean Logic and Fuzzy Logic. If we use Boolean Logic to describe building tallness we might say that buildings between 1 and 35 stories high are not tall, while buildings that are more than 35 stories high are tall. The use of Boolean logic, at this granularity at least, forces the choice between tall and not tall, so a building that is 34 stories high is viewed in tallness terms the same as a building that is just a story or two in height. Fuzzy Logic, on the other hand, provides the programmer with the ability to easily and accurately characterize the tallness of the 34 story building.

Figure 5:
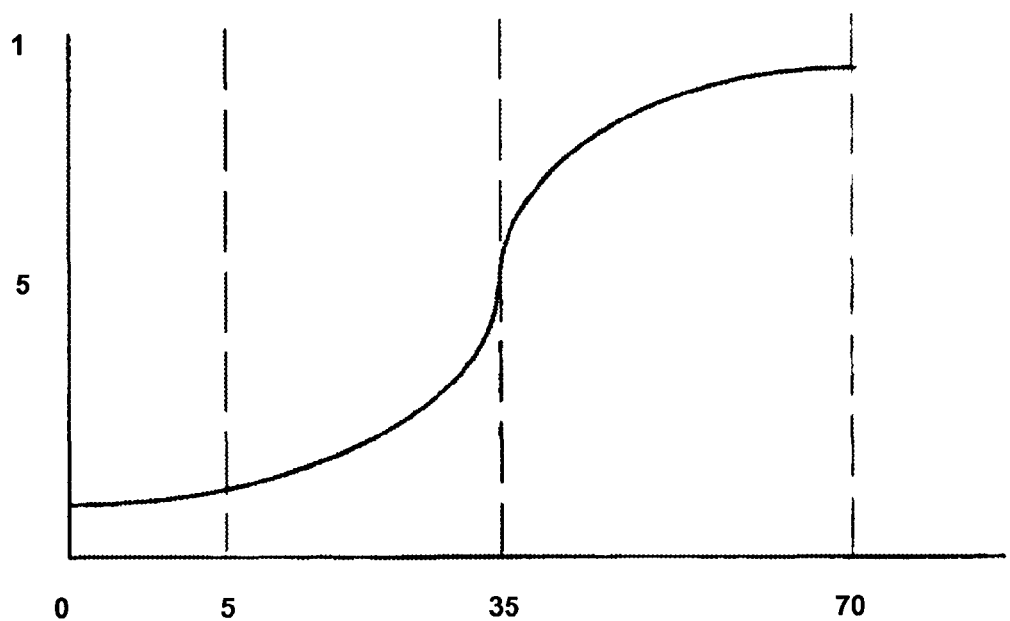
FIG. 5 is a chart showing an exemplary Fuzzy Set representation for "Tall" as applied to buildings.

Central to Fuzzy Logic is the concept of a Fuzzy Set. A Fuzzy Set is essentially a multivariate representation of the degree to which a value is a member of a set of values. Please consider the following example. Building A is five stories high, Building B is thirty-five stories high, and Building C is seventy stories high. The Fuzzy Set shown in FIG. 5 is the Fuzzy Set for "Tall."

Applying the values 5, 35, and 70 to the Tall Fuzzy Set would yield the following results.

| Building | Degree of Tallness |
|---|---|
| Building A | .2 |
| Building B | .5 |
| Building C | 1 |

In Fuzzy Logic terms, then, the question as to whether a building is tall can be interpreted as a degree of truth, ranging from completely untrue (0) to completely true (1). For example, the statement of whether Building B is tall can be interpreted as a degree of truth, here 0.5. Thus, the 34 story building example mentioned above can be described in Fuzzy Logic terms as being 0.48 Tall. While it is true that the granularity of the Boolean Logic approach could be increased to yield a more accurate representation of tallness, such an approach would require more work and still suffer from arbitrary distinctions for values at or around the various boundaries.

Description of the Preferred Embodiment

Figure 1:
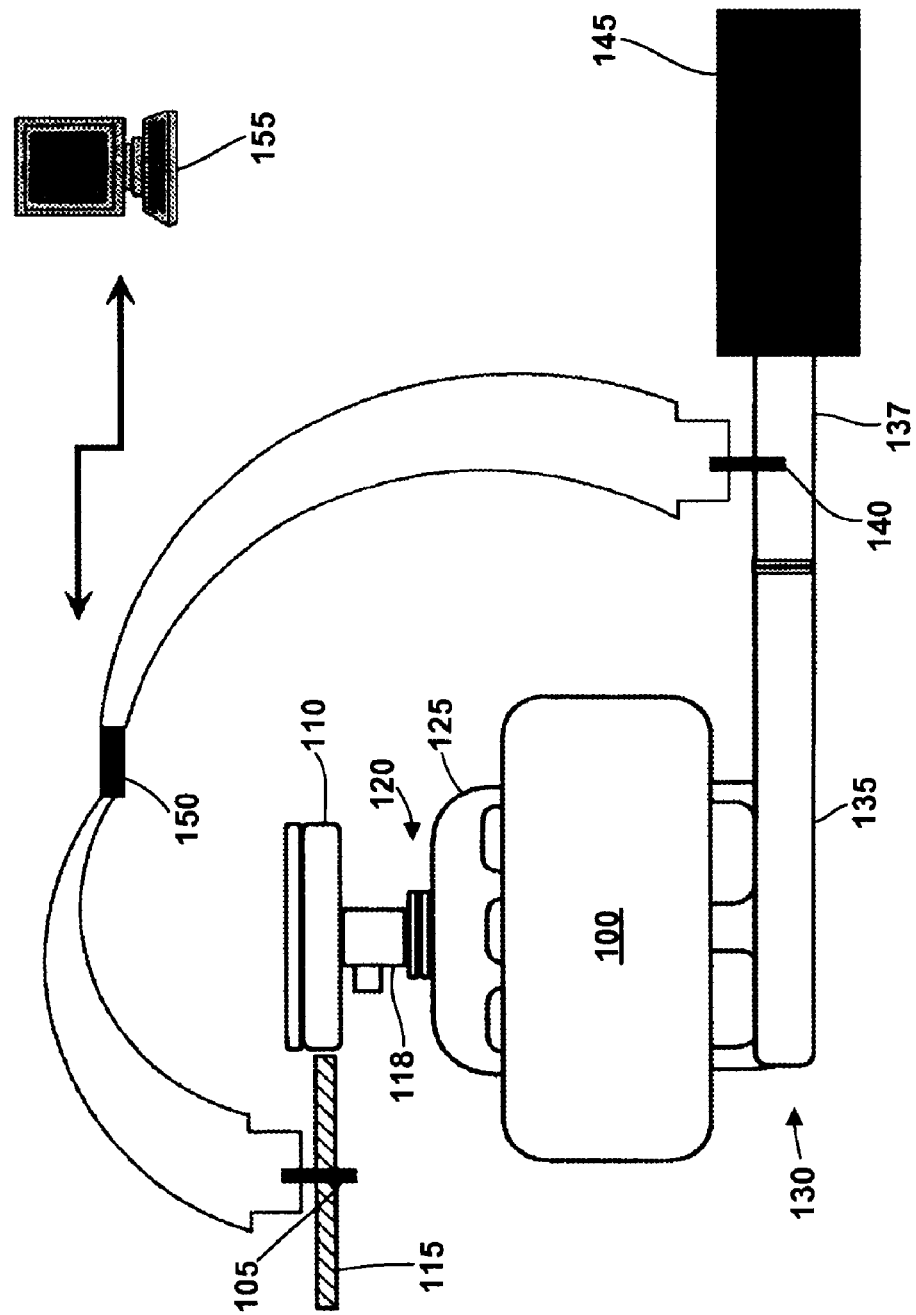
FIG. 1 is a block diagram showing an automotive environment that is capable of supporting the preferred embodiment of the present invention.

Turning now to the drawings, FIG. 1 shows some of the operational components used in the preferred embodiment of the present invention. The preferred embodiment of the present invention is an automobile control system. It should be noted, though, that the present invention is not limited to an automotive environment or to control systems.

Internal Combustion Engine 100 having an associated Combustion Mixture Intake System 120 and an Exhaust System 130. Intake System 120 is comprised of Intake Manifold 125, which is fixedly coupled to Engine 100 and is arranged to provide a flow of the combustible air/fuel mixture to Engine 100. Air/Fuel Mixture Preparation Device 118 is fixedly coupled Intake Manifold 125 upstream from the intake ports of Engine 100 and may be, for example, a carburetor or any other form of device for producing an air/fuel mixture. Intake Air Cleaner 110 is illustrated as being upstream from the mixture preparation device.

In the preferred embodiment, Air/Fuel Mixture Preparation Device 118 includes an electrical means for modulating either the air or the fuel content of the air/fuel mixture in order to controllably vary the mixture ratio. Those skilled in the art will appreciate that this adjustment can be accomplished in a variety of ways. For example, the mixture ratio may be controllably varied electronically through the use of a continuous flow fuel delivery device having an electrically controlled metering orifice in conjunction with a carburetor or fuel injection system or through a scheduling control arranged to modulate the injector valve open time in an intermittent fuel injection system. Alternatively, the air content of the combustion mixture may be varied with an electronically controlled air valve within intake system 120. Mass Air Flow (MAF) sensor 105 is threadedly received by a wall portion of Fresh Air Intake Conduit 115 so that the active portion of MAF 105 extends into the interior region of conduit 115. First and second pairs of electrical leads extend from MAF 105 and communicate with controller 150.

Exhaust system 130 includes exhaust an exhaust manifold 135 and an exhaust conduit 137. Exhaust conduit 137 communicates with exhaust gas reactor 145, which can be of the thermal or catalytic variety and may also communicate with an exhaust silencer such as a muffler in conducting the combustion of by-product exhaust gases from the combustion chambers of the engine 100 to the atmosphere while reducing the gaseous and noise pollutants which are also by-products of the combustion process. An exhaust gas sensor 140, which is also known as an oxygen sensor, is threadedly received by a wall portion of conduit 137 so that the active portion of the exhaust gas sensor 140 extends into the interior region of conduit 137. First and second pairs of electrical leads extend from the exhaust gas sensor 140 and communicate with Controller 150. The precise placement of sensor 140 will depend upon temperature and other considerations such as accessibility, vibration and availability of electrical power.

Figure 2:
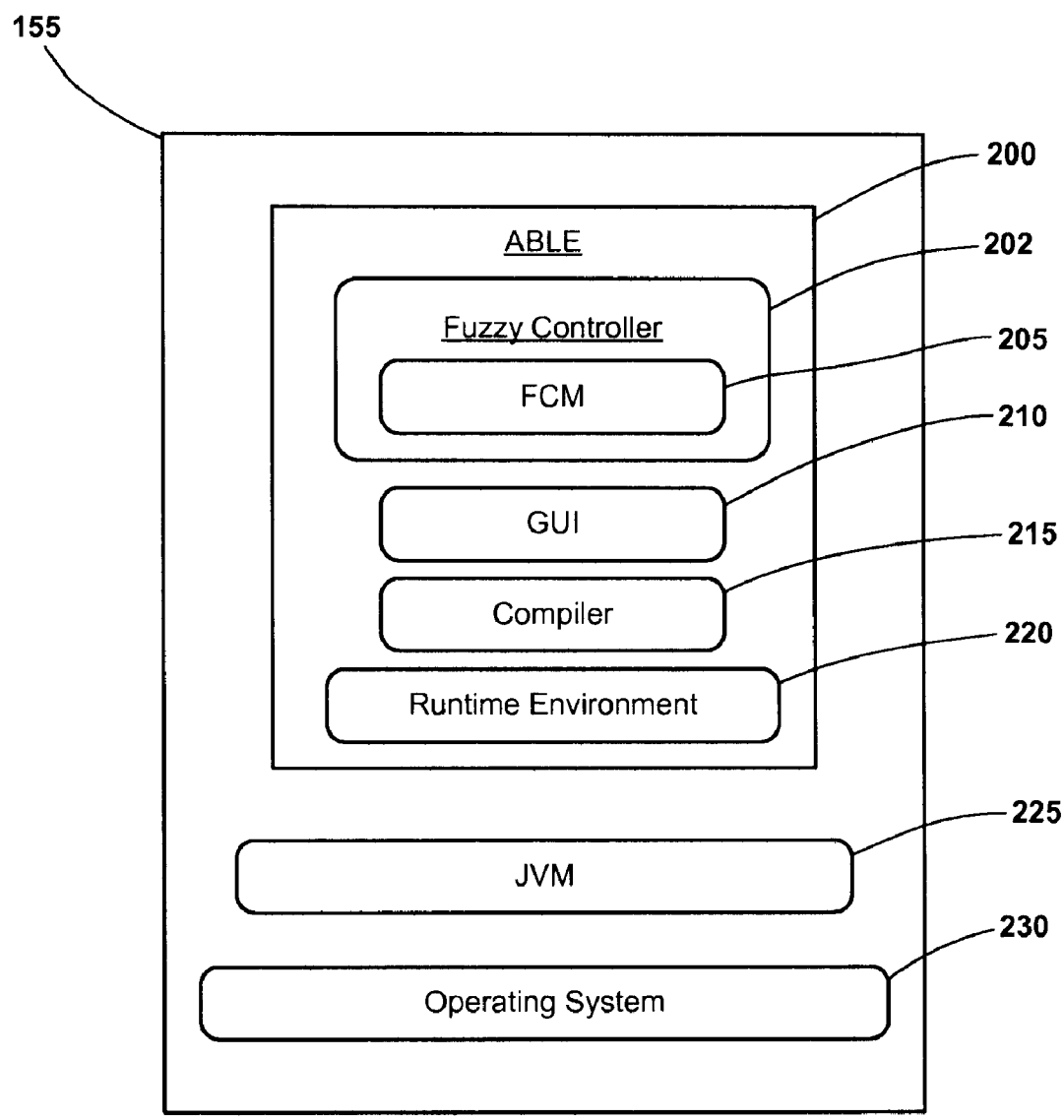
FIG. 2 is a block diagram showing a computing environment that is capable of supporting the preferred embodiment of the present invention.

Controller 150 Maintenance Station (MS) 155. MS 155 is used in the preferred embodiment to program and maintain Controller 150. MS 155 is a standard IBM compatible workstation. Depicted on FIG. 2 is an exploded view of the memory of MS 155. As shown, the memory of MS 155 includes Operating System 230, JVM 225, and ABLE 200. Operating System 230 of the preferred embodiment is that known in the industry as Linux, although other operating capable of supporting a Java®[1] Virtual Machine (JVM) could also be used. JVM 225 is the just-mentioned Java® Virtual Machine. Executing on JVM 225 is Agent Building and Learning Environment (ABLE) 200. Contained within ABLE 200 are Runtime Environment 220, Compiler 215, GUI 210, and Fuzzy Controller 202.

[1] Java is a registered trademark of Sun Microsystems Inc.

Figure 3:
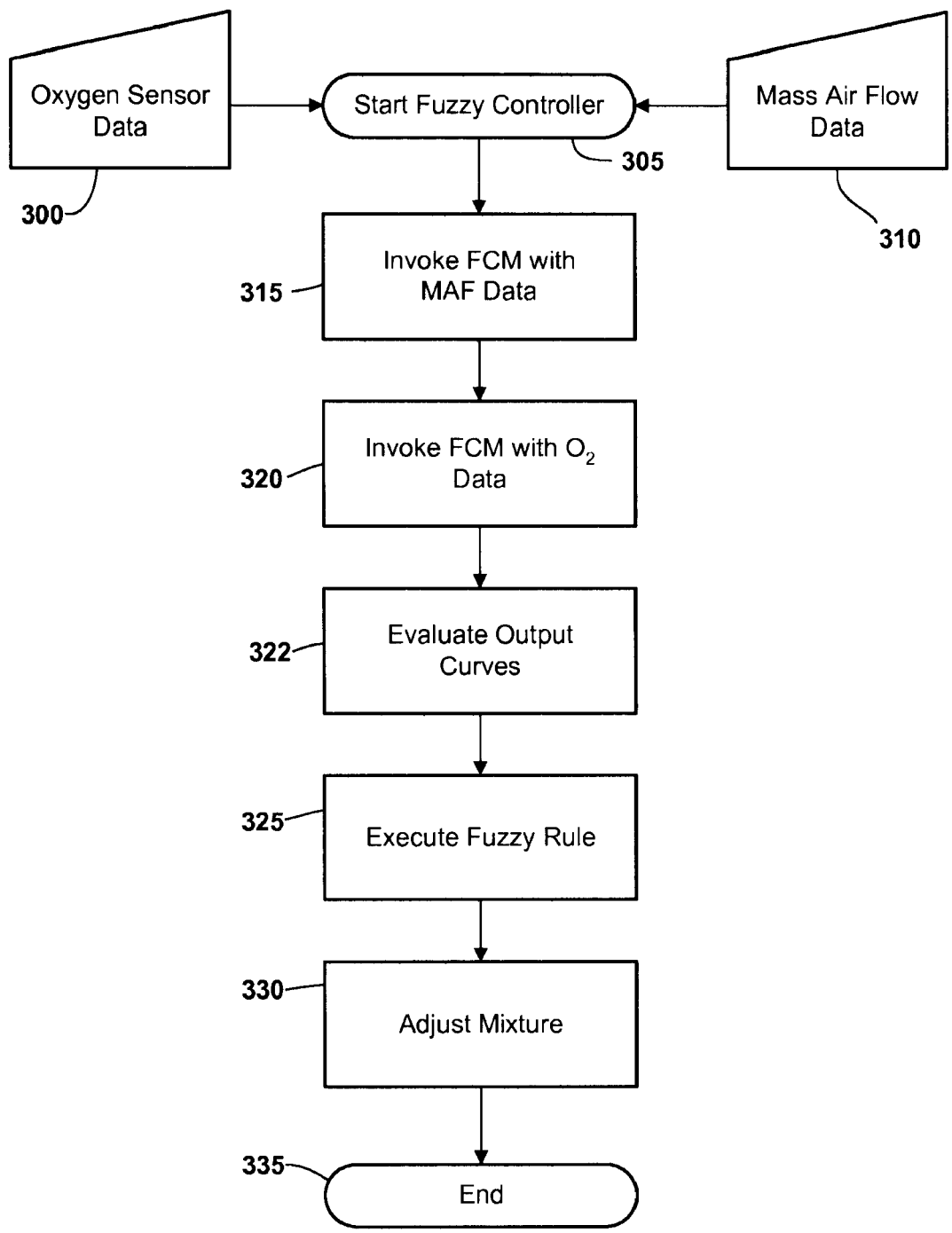
FIGS. 3 through 4B are flow diagrams showing highlighted steps of the Fuzzy Controller of the preferred embodiment.

A programmer uses GUI 210 and certain tools provided by ABLE (not shown) to create Fuzzy Rules and Fuzzy Rule Sets. These rules and rule sets are then compiled using Compiler 215 to create executable programs. The executable programs are then executed using Runtime Environment 220. Fuzzy Controller 202 is the program of interest in the preferred embodiment. Fuzzy Controller 202 is created and tested on MS 155 before ultimately being downloaded onto Controller 150. In the preferred embodiment, Fuzzy Controller 202 is used to monitor time series data generated by sensors 105 and 140 and to adjust the air/fuel mixture used by engine 100. Fuzzy Controller 202 contains a curve matching mechanism, which is referred to in the preferred embodiment as Fuzzy Curve Matcher 205. Fuzzy Controller 202 and Fuzzy Curve Matcher 205 are described in the text associated with FIGS. 3 through 4B.

Fuzzy Controller 202 receives Oxygen Sensor data and Mass Air Flow Sensor data in block 305. In the preferred embodiment both data items are presented to Fuzzy Controller 202 in the form of voltage levels that vary over time. As such that each fall into the class of time series data, which is itself a form of curve data, as that term is used herein. In the preferred embodiment, the data is processed two hundred and fifty six (256) time slices at a time. When considered together, the time slices form a curve of time series data. After acquiring the curve data, Fuzzy Controller 202 invokes Fuzzy Curve Matcher (FCM) 205 with the data from Mass Air Flow Sensor 105.

Mass Air Flow Sensor 105 of the preferred embodiment measures the amount of air moving through conduit 115. The amount of air changes over time, forming a curve of time series data. The curve of time series data is represented in the preferred embodiment by 256 values ranging from zero (0) to one (1). The presentation of this data to FCM 205 is shown in block 415 of FIG. 4A. Also presented to FCM 205 are six Standard Fuzzy Sets (block 405). Each Fuzzy Set represents a standard curve. Like the input curve, each standard curve is represented by 256 values ranging form 0 to 1. The curves are characterized as follows: monotonically increasing, monotonically decreasing, inflected up, inflected down, and flat. In Fuzzy Logic terms, these standard curves are respectively represented by the Fuzzy Variables: rising, falling, variant up, variant down, and constant. As will be described in more detail, the input data curve is compared with each standard curve to determine a degree of similarity, or using Fuzzy Logic terminology, a degree of membership in each Fuzzy Set. The degree of similarity to each standard curve is represented as an output curve, again having 256 values ranging from 0 to 1.

Figure 4A:
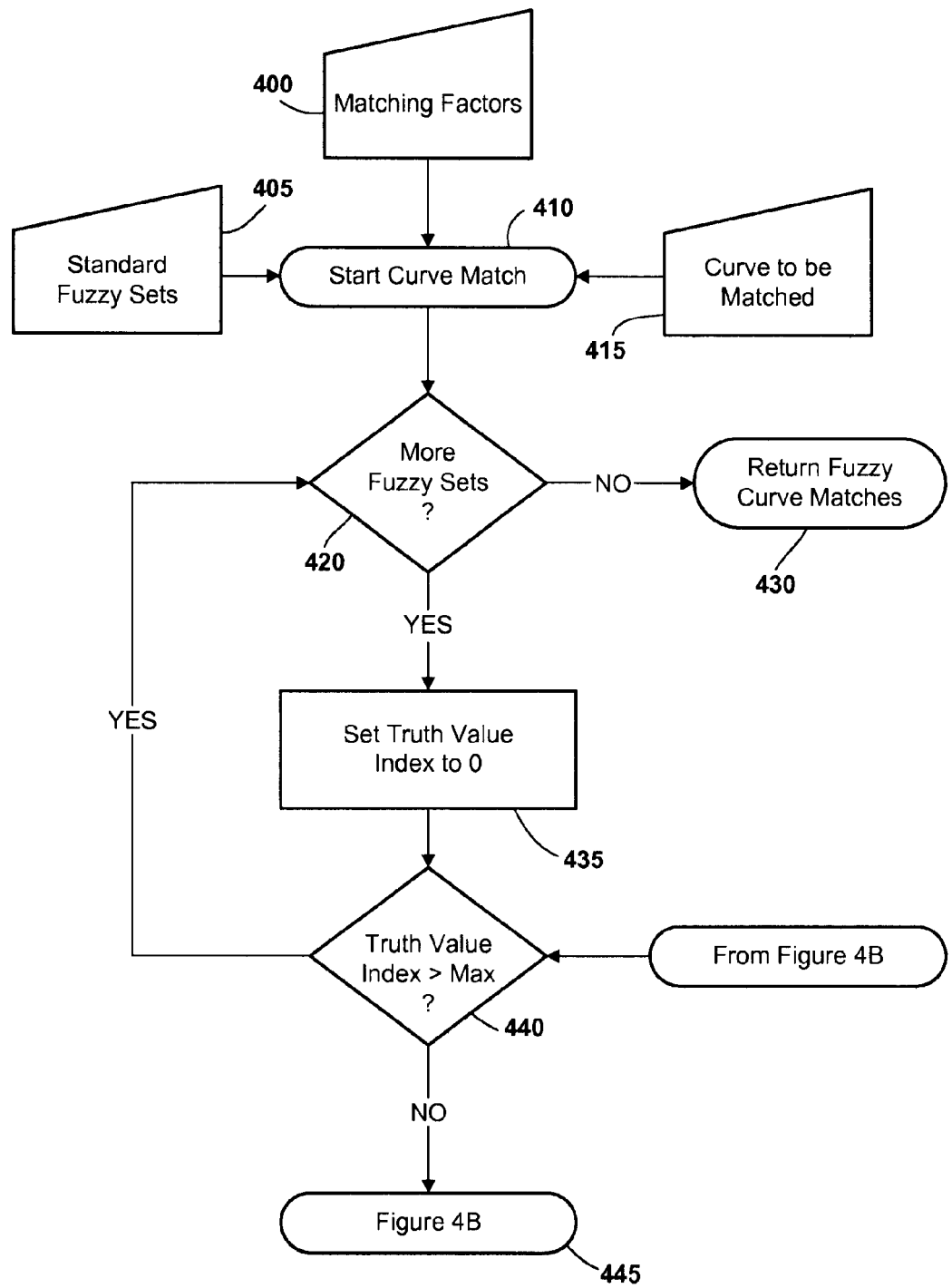

Certain matching factors are also supplied to FCM 205. The matching factors are used to vary the degree of strictness used by the algorithm in determining the degree of difference between the input curves and the standard curves. Blocks 420 and 440 of FIG. 4A are used to ensure that the input curve is compared to each Fuzzy Set. Since we have yet to compare the input curve to a Fuzzy Set, block 420 will test out to YES, meaning the truth value index will be set to zero (0) in block 435. Block 440 tests out to NO since the comparison has just begun.

Figure 4B:
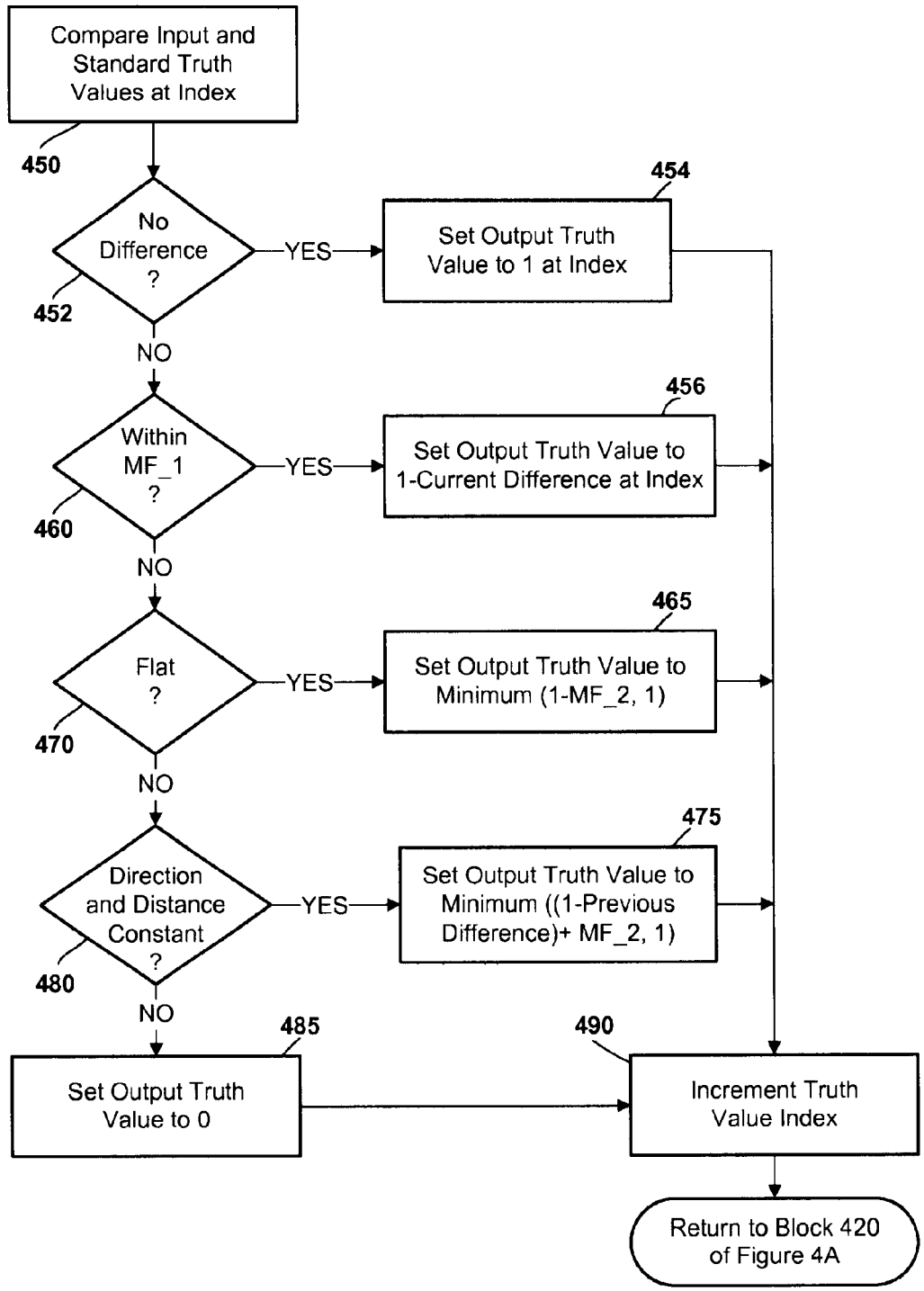

Moving next to FIG. 4B, the first input curve value (i.e., at location 0) is compared with the first curve value of the first standard curve [block 450]. FCM 205 then determines whether there is any difference between the two values [block 452]. (In the preferred embodiment, the difference is calculated by taking the absolute value of the difference between the standard curve value from the input curve value.) If not, FCM 205 sets the first value of the output curve to 1 [block 454] before incrementing the index in block 490 and returning to block 440 of FIG. 4A. If there is a difference detected in block 452, FCM 205 next determines in block 460 whether the difference is within the first matching factor. In the preferred embodiment, the first matching factor used by FCM 205 is purely a consideration of amount of difference. If the difference is fairly small, as determined by the matching factor, the curves are considered to be identical at the point represented by the standard and input values. If the difference is determined to be within the first matching factor the output value is set to 1 minus the difference. If the difference is not within the first matching factor, FCM 205 considers whether the curves are flat. If the curves are flat they are considered to match at that point. If the curves are flat, the output value is set to the minimum of 1 minus the value of the second matching factor and 1 (i.e., Min (1−MF_2, 1)).

As a final inquiry, FCM 205 considers whether or not the direction of the two curves and distance between the two curves remains fairly constant. In the preferred embodiment, this is accomplished by considering the distance between the two values and the slopes of the two curves as determined by examination of multiple values. If the direction and distance remain fairly constant the output value is set to the minimum of 1 minus the previous difference between the input and current value plus the second matching factor and 1 (i.e., Min ((1−PrevDiff)+MF_2, 1)).

If decision blocks 452, 460, 470, and 480 all evaluate to NO, FCM 205 sets the output value to 0 to indicate that the values simply do not match in any way. Regardless of the outcomes of the determinations made above, FCM 205 ultimately increments the truth value index n block 490 before returning to block 420 of FIG. 4A. In block 420, the truth value index is tested against the maximum (i.e., 255 in the case of the preferred embodiment). If the index is not yet greater than the maximum, the processing of FIG. 4B is repeated. If the maximum has been exceeded, another Fuzzy Set is considered [blocks 420, 435, 445, etc.]. Once all of the Fuzzy Sets have been considered, the output match curves (Curve Data Description Information) are returned to Fuzzy Controller 202 in block 430.

In block 320, Fuzzy Controller 202 repeats the process by invoking FCM 205 using the Oxygen Sensor data this time. As was the case with the Mass Air Flow data, the Oxygen Sensor data is matched against a set of standard curves by FCM 205. FCM 205 then returns a set of output curves, one for each standard curve, showing the degree of similarity between the input curve and each standard curve. In block 322 or FIG. 3, the output curves are evaluated to identify a "greatest match" curve in each output curve set. Fuzzy Rules are then executed using the results of the match [block 325]. The result of the rule leads to adjustment of the air fuel mixture in block 330. Fuzzy Controller 202 then terminates execution in block 335.

As a brief example, consider Mass Air Flow sensor data that is generally constant over time. Said another way, the 256 values representing the input data curve from Mass Air Flow Sensor 105 stay more or less constant during the sampling period. Assume too that the data from Oxygen Sensor 140 to be more or less decreasing over time. This data is then presented to FCM 205 by Fuzzy Controller 202. Given these assumed data characteristics, analysis of the output curve sets returned by FCM 205 will yield a high correlation between the Mass Air Flow data and the flat standard curve and also between the Oxygen Sensor data and the monotonically decreasing curve.

The following rule would then be executed in block 325.

If Air Flow Constant and Oxygen Falling, then increase Fuel.

The result of the execution of this rule by controller 150 will cause Mixture Preparation Device 118 to increase the amount of fuel to engine 100

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. An apparatus, said apparatus comprising:
   a controller, and
   a curve matching mechanism that executes under the direction of said controller, said curve matching mechanism receiving curve data as an input, said curve data comprising a plurality of data points representing a curve, said curve matching mechanism using Fuzzy Logic to describe said curve represented by said curve data and to thereby create curve data description information, said curve data description information then being available to said controller.

2. The apparatus of claim 1 wherein said controller is a Fuzzy Logic controller that executes on a processor.

3. The apparatus of claim 1 wherein said curve data is time series data.

4. The apparatus of claim 1 wherein said curve data is described by comparing said curve data to at least one standard curve, said at least one standard curve being a Fuzzy Set.

5. The apparatus of claim 1 wherein said curve data description information is an output curve.

6. The apparatus of claim 5 wherein said at least one output curve shows a degree of similarity between said curve data and said at least one standard curve.

7. An apparatus, said apparatus comprising:
a Fuzzy Controller that executes on a processor, and
a curve matching mechanism that executes under the direction of said Fuzzy Controller, said curve matching mechanism receiving curve data as an input, said curve data comprising a plurality of data points representing a curve, said curve matching mechanism using Fuzzy Logic to describe said curve represented by said curve data and to thereby create curve data description information, said curve data description information then being available to said Fuzzy Controller, said Fuzzy Controller then using said curve description information to at least partially control said apparatus.

8. The apparatus of claim 7 wherein said curve data is time series data.

9. The apparatus of claim 7 wherein said curve data is described by comparing said curve data to at least one standard curve, said at least one standard curve being a Fuzzy Set.

10. The apparatus of claim 7 wherein said curve data description information is an output curve.

11. The apparatus of claim 10 wherein said at least one output curve shows a degree of similarity between said curve data and said at least one standard curve.

12. An apparatus, said apparatus comprising:
an engine;
a Fuzzy Controller that executes on a processor, said processor being associated with said engine; and
a curve matching mechanism that executes under the direction of said Fuzzy Controller, said curve matching mechanism receiving curve data as an input, said curve data comprising a plurality of data points representing a curve, said curve matching mechanism using Fuzzy Logic to describe said curve represented by said curve data and to thereby create curve data description information, said curve data description information then being available to said Fuzzy Controller, said Fuzzy Controller then using said curve description information to at least partially control said apparatus.

13. The apparatus of claim 12 wherein said curve data is time series data.

14. The apparatus of claim 12 wherein said curve data is described by comparing said curve data to at least one standard curve, said at least one standard curve being a Fuzzy Set.

15. The apparatus of claim 12 wherein said curve data description information is an output curve.

16. The apparatus of claim 15 wherein said at least one output curve shows a degree of similarity between said curve data and said at least one standard curve.

17. The apparatus of claim 12 wherein said engine is contained within a vehicle.

18. A program product, said program product comprising:
a controller, and
a curve matching mechanism that executes under the direction of said controller, said curve matching mechanism receiving curve data as an input, said curve data comprising a plurality of data points representing a curve, said curve matching mechanism using Fuzzy Logic to describe said curve represented by said curve data and to thereby create curve data description information, said curve data description information then being available to said controller.

19. The program product of claim 18 wherein said controller is a Fuzzy Logic controller that executes on a processor.

20. The program product of claim 18 wherein said curve data is time series data.

21. The program product of claim 18 wherein said curve data is described by comparing said curve data to at least one standard curve, said at least one standard curve being a Fuzzy Set.

22. The program product of claim 18 wherein said curve data description information is an output curve.

23. The program product of claim 22 wherein said at least one output curve shows a degree of similarity between said curve data and said at least one standard curve.

24. A method, said method comprising the steps of:
receiving curve data as input, said curve data comprising a plurality of data points representing a curve;
describing said curve represented by said curve data using Fuzzy Logic to create curve data description information; and
using said curve data description information to at least partially control an apparatus.

25. The method of claim 24 wherein said step of at least partially controlling an apparatus is performed by a Fuzzy Logic controller that executes on a processor.

26. The method of claim 24 wherein said curve data is time series data.

27. The method of claim 24 wherein said curve data is described by comparing said curve data to at least one standard curve, said at least one standard curve being a Fuzzy Set.

28. The method of claim 27 wherein said curve data description information is an output curve.

29. The method of claim 24 wherein said at least one output curve shows a degree of similarity between said curve data and said at least one standard curve.

30. A method, said method comprising the steps of:
receiving data representing an input curve as input;
determining membership of said input curve in at least one Fuzzy Set, each said Fuzzy Set expressing a property of a respective at least one curve;
outputting at least one respective input curve membership value representing degree of membership of said input curve in each said Fuzzy Set; and
using said at least one respective input curve membership value to at least partially control an apparatus.

* * * * *